(No Model.)
J. FOLEY.
CISTERN ATTACHMENT FOR WATER CLOSETS.
No. 282,876. Patented Aug. 7, 1883.
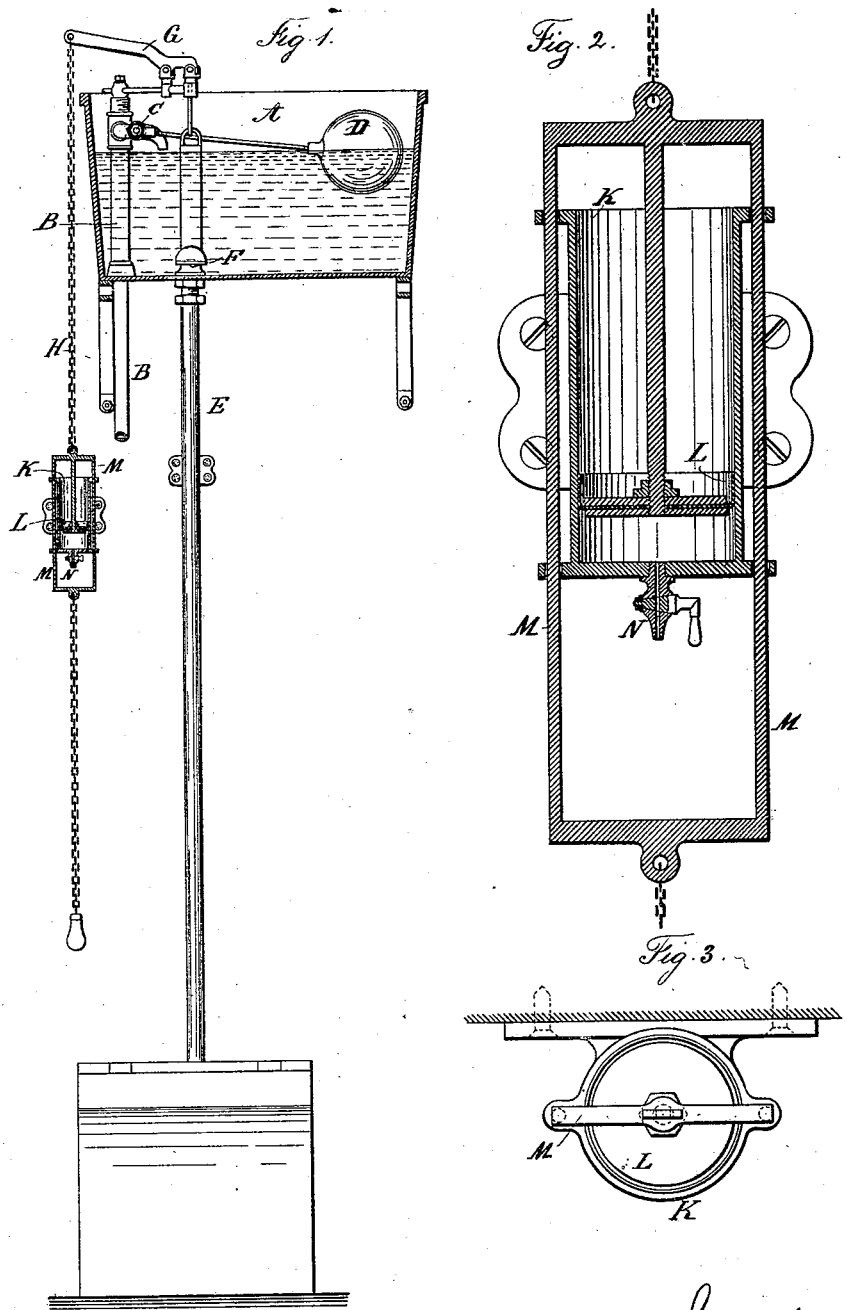

UNITED STATES PATENT OFFICE.

JAMES FOLEY, OF BROOKLYN, NEW YORK.

CISTERN ATTACHMENT FOR WATER-CLOSETS.

SPECIFICATION forming part of Letters Patent No. 282,876, dated August 7, 1883.

Application filed April 2, 1883. (No model.)

*To all whom it may concern:*

Be it known that I, JAMES FOLEY, of Brooklyn, in the county of Kings and State of New York, have invented an Improvement in Cistern Attachments for Water-Closets, of which the following is a specification.

Water-closet-cistern valves have been lifted by a pull to the handle, seat, or platform to open the same, and it is usual to allow the water to run into a service-box; but in some instances the valve has been allowed to descend gradually as the water is displaced from a variable chamber. It is difficult to get at this cistern-valve for cleaning or repairs, especially where the sediment of the cistern is liable to pass into the variable chamber.

My invention relates to an air-chamber and plunger combined with the pull-wire and the cistern and valve, whereby the air-chamber and plunger prevent the valve closing suddenly and hold the valve open the time necessary to allow the required wash of water to pass to the closet.

In the drawings, Figure 1 is an elevation, partially in section, of the water-closet cistern and air-chamber. Fig. 2 is a section, in larger size, of the air-chamber; and Fig. 3 is a plan of the same.

The water-closet cistern A is of any desired character. It is to be provided with a water-supply pipe, B, cock C, and float D, or other device for maintaining the proper amount of water in the cistern.

Instead of service-box, I only make use of a pipe, E, that leads the water to the water-closet or urinal, and provide a valve, F, within the cistern, at the bottom thereof, to close the upper end of the said pipe E. This valve F is usually a weighted valve with a leather face resting upon a raised seat. I prefer to use a tubular stem, which becomes the overflow-pipe, as usual. The lever G is connected at one end to the valve-stem and at the other end to the pull wire or chain H, and this is acted upon by the pull-handle of the closet by the movable seat, or by a platform or door, as desired.

My air-chamber is formed of a cylinder, K, and the plunger L is within the same. It is preferably a cup-leather plunger, and the cylinder and plunger are so connected with the pull wire or chain that the plunger will be moved in one direction when the valve is opened, and the movement in the other direction will be gradual in consequence of the atmosphere passing into or out of the cylinder gradually.

At N, I have shown an opening with a cock or screw to regulate the size thereof, and the cylinder K is shown as stationary and the plunger as connected to the frame M, that passes at the sides of the cylinder, and is connected at top and bottom, respectively, to the parts of the pull chain or wire H, so that when the pull is operated the plunger is forced down into the cylinder and the air easily displaced around it; but as the weighted lever tends to fall and close the valve F the plunger produces a vacuum action, and the air-pressure only allows the plunger to move and the valve to close gradually as the air leaks into the said cylinder.

The parts may be inverted in position and the plunger remain stationary and the cylinder be drawn down over the plunger, or the cylinder may be closed at the top, where the rod of the plunger passes through, so that the air will be compressed as the valve descends, and that the compressed air will prevent the valve closing suddenly, and only allow the same to move as the air passes out of the cylinder.

I claim as my invention—

The combination, with the cistern-valve, water-pipe to the closet or urinal, and the pull for the valve, of an air-chamber and plunger to regulate the gradual closing of the valve, substantially as set forth.

Signed by me this 27th day of March, A. D. 1883.

JAMES FOLEY.

Witnesses:
 GEO. T. PINCKNEY,
 CHAS. H. SMITH.